United States Patent
Kubota et al.

(10) Patent No.: US 7,653,456 B2
(45) Date of Patent: Jan. 26, 2010

(54) METHOD AND SYSTEM FOR MONITORING APPARATUS

(75) Inventors: Kazuto Kubota, Kawasaki (JP); Hisaaki Hatano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 129 days.

(21) Appl. No.: 11/857,115

(22) Filed: Sep. 18, 2007

(65) Prior Publication Data

US 2008/0161946 A1  Jul. 3, 2008

(30) Foreign Application Priority Data

Dec. 28, 2006  (JP)  ............................. 2006-356177

(51) Int. Cl.
*G06F 19/00* (2006.01)

(52) U.S. Cl. .................. 700/177; 706/45; 709/223; 713/400

(58) Field of Classification Search ............ 700/19, 700/177; 702/185; 706/15, 19, 45; 709/223; 713/400
See application file for complete search history.

(56) References Cited

U.S. PATENT DOCUMENTS

| | | | |
|---|---|---|---|
| 6,330,488 B1 * | 12/2001 | Yoshida et al. ............... | 700/177 |
| 6,782,345 B1 | 8/2004 | Siegel et al. | |
| 7,318,166 B2 * | 1/2008 | Sohda ........................ | 713/400 |
| 7,437,446 B2 * | 10/2008 | Bailey et al. ................ | 709/223 |
| 7,464,063 B2 * | 12/2008 | Vatchkov et al. .............. | 706/45 |

FOREIGN PATENT DOCUMENTS

JP    2006-135412    5/2006

\* cited by examiner

*Primary Examiner*—Albert DeCady
*Assistant Examiner*—Douglas S Lee
(74) *Attorney, Agent, or Firm*—Turocy & Watson, LLP

(57) ABSTRACT

There is provided with a monitoring method of monitoring plural apparatuses each having a sensor, including: selecting two or more sample apparatuses out of the plural apparatuses; calculating averages and standard deviations of sensor values detected by the sample apparatuses for each sample apparatus; calculating a confidence interval of the averages and an average of the standard deviations; and calculating an average of sensor values detected by an arbitrary apparatus among the plural apparatuses as an object average and calculating a normal range of the sensor of the arbitrary apparatus from the object average, the confidence interval, and the average of the standard deviations.

17 Claims, 14 Drawing Sheets mm=4, ms=0.667
sm=0.60

| | 1(1) | 1(2) | 1(3) | 1(4) |
|---|---|---|---|---|
| m | 3 | 5 | 4 | 4 |
| s | 0.58 | 0.60 | 0.62 | 0.60 |

FIG. 5

| TIME | 1 | 2 | 3 | 4 | 5 |
|------|-----|-----|-----|-----|-----|
| S1   | 3.6 | 3.7 | 3.7 | 3.4 | 3.5 | ldm=3.58

FIG. 6

| TIME | 1 | 2 | 3 | 4 | 5 |
|---|---|---|---|---|---|
| AVERAGE OF MONITORING MODELS | 3.78 | 3.75 | 3.73 | 3.66 | 3.64 |

FIG. 9

| TIME | 1 | 2 | 3 | 4 | 5 |
|---|---|---|---|---|---|
| S1 | 1.2 | 1.3 | 3.6 | 3.7 | 3.7 |

FIG. 11

| TIME | 1 | 2 | 3 | 4 | 5 |
|---|---|---|---|---|---|
| AVERAGE OF MONITORING MODELS | NA | NA | 3.78 | 3.75 | 3.73 |

FIG. 12

| INDIVIDUAL NUMBER | INSTALLATION YEAR | TYPE | LOCATION | CLUSTER |
|---|---|---|---|---|
| ID1 | 2002 | P | KANTO | A |
| ID2 | 2001 | Q | KANTO | A |
| ID3 | 2006 | Q | KANTO | B |
| ID4 | 2005 | P | KANTO | B |
| ID5 | 2004 | Q | KANSAI | A |
| ID6 | 2004 | Q | KANSAI | A |
| ID7 | 2005 | Q | KANSAI | B |
| ID8 | 2006 | P | KANSAI | B |

METHOD AND SYSTEM FOR MONITORING APPARATUS

CROSS-REFERENCE TO RELATED APPLICATIONS

This application is based upon and claims the benefit of priority from the prior Japanese Patent Applications No. 2006-356177 filed on Dec. 28, 2006, the entire contents of which are incorporated herein by reference.

BACKGROUND OF THE INVENTION

1. Field of the Invention

The present invention relates to an apparatus monitoring method and an apparatus monitoring system and relates to, for example, a technique for judging abnormality of an apparatus from values of a sensor.

2. Related Art

There is an increasing need for remote monitoring for improvement of safety of apparatuses and reduction in monitoring cost. There is monitoring of abnormality as one of matters that should be realized in the remote monitoring. Abnormality of an apparatus is judged from a value of a sensor. An upper limit and a lower limit of values that should be taken by the sensor are given. When a value of the sensor deviates from this range (a normal range), the apparatus is considered abnormal. It is possible to determine the upper limit and the lower limit of sensor values by using history data of sensor values. For example, there is a method of, assuming that fluctuation in sensor values is a normal distribution, calculating an average "$\mu$" and a standard deviation "$\sigma$" and setting $\mu \pm 3\sigma$ as an upper limit and a lower limit.

The remote monitoring has a characteristic that a large number of identical apparatuses are objects of monitoring. It is difficult to collect sensor data in all of these apparatuses and determine an upper limit and a lower limit. Since there is no history data of sensor values of an apparatus installed anew, it is impossible to set an upper limit and a lower limit. Therefore, a method of sampling several apparatuses among the object apparatuses and determining an upper limit and a lower limit using sensor data of the apparatuses sampled is conceivable. However, it is likely that there are individual differences among apparatuses even if the apparatuses are identical. It may be difficult to uniquely determine an upper limit and a lower limit of sensor values of the remaining apparatuses from the sensor data of the apparatuses sampled. In other words, an upper limit and a lower limit of sensor values determined from the apparatuses samples are not always satisfactorily adapted to finding of abnormality of the remaining apparatuses.

SUMMARY OF THE INVENTION

According to an aspect of the present invention, there is provided with a monitoring method of monitoring plural apparatuses each having a sensor, comprising:

selecting two or more sample apparatuses out of the plural apparatuses;

calculating averages and standard deviations of sensor values detected by the sample apparatuses for each sample apparatus;

calculating a confidence interval of the averages and an average of the standard deviations; and calculating an average of sensor values detected by an arbitrary apparatus among the plural apparatuses as an object average and calculating a normal range of the sensor of the arbitrary apparatus from the object average, the confidence interval, and the average of the standard deviations.

According to an aspect of the present invention, there is provided with a monitoring method that monitors plural apparatuses each having a sensor, comprising:

selecting two or more sample apparatuses out of the plural apparatuses;

calculating, by sensor values detected from the sample apparatuses, a sample average obtained by averaging averages of sensor values of each sample apparatus, a sample standard deviation that is a standard deviation of the averages of the sensor values of each sample apparatus, and a standard deviation average obtained by averaging standard deviations of the sensor values of each sample apparatus; and calculating a mean of a normal distribution of averages of sensor values of an arbitrary apparatus among the plural apparatuses or a value within a threshold range with respect to the mean by using a number and an average of the sensor values detected from the arbitrary apparatus, the sample average, the sample standard deviation, and the standard deviation average, and calculating a normal range of the sensor of the arbitrary apparatus from the mean or the value within the threshold range and the standard deviation average.

According to an aspect of the present invention, there is provided with a monitoring system that monitors plural apparatuses each having a sensor, comprising:

a selecting unit configured to select two or more sample apparatuses out of the plural apparatuses;

a first calculating unit configured to calculate averages and standard deviations of sensor values detected by the sample apparatuses for each sample apparatus;

a second calculating unit configured to calculate a confidence interval of the averages and an average of the standard deviations; and a normal-range calculating unit configured to calculate an average of sensor values detected by an arbitrary apparatus among the plural apparatuses as an object average and calculate a normal range of the sensor of the arbitrary apparatus from the object average, the confidence interval, and the average of the standard deviations.

According to an aspect of the present invention, there is provided with a monitoring system that monitors plural apparatuses each having a sensor, comprising:

a selecting unit configured to select two or more sample apparatuses out of the plural apparatuses;

a third calculating unit configured to calculate, using sensor values detected from the sample apparatuses, a sample average obtained by averaging averages of sensor values of each sample apparatus, a sample standard deviation that is a standard deviation of the averages of the sensor values of each sample apparatus, and a standard deviation average obtained by averaging standard deviations of the sensor values of each sample apparatus; and a normal-range calculating unit configured to calculate a mean of a normal distribution of averages of sensor values of an arbitrary apparatus among the plural apparatuses or a value within a threshold range with respect to the mean by using a number and an average of the sensor values detected from the arbitrary apparatus and the sample average, the sample standard deviation, and the standard deviation average calculated in the third calculating unit, and calculate a normal range of the sensor of the arbitrary apparatus from the mean or the value within the threshold range and the standard deviation average.

BRIEF DESCRIPTION OF THE DRAWINGS

FIG. 5 is a diagram showing an average "m" of sample apparatus data, average "mm" of averages, a variance "ms" of the averages, and an average "sm" of standard deviations "s";

FIG. 6 is a diagram showing sensor S1 data (for 5 times) acquired in the local apparatus;

FIG. 9 is a diagram showing transition of an average of monitoring models;

FIG. 11 is a diagram showing sensor S1 data (No. 2) acquired in a local apparatus;

FIG. 12 is a diagram showing transition (No. 2) of an average of monitoring models;

DETAILED DESCRIPTION OF THE INVENTION

First Embodiment

Figure 1:
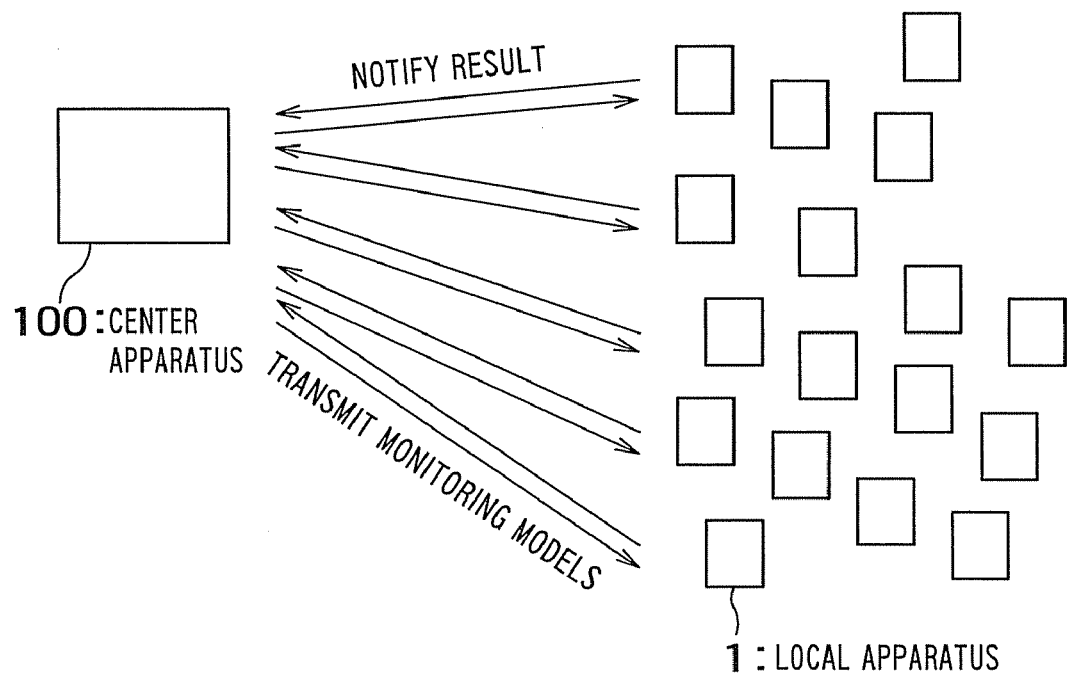
FIG. 1 is a diagram showing an overall structure of a monitoring system.
Figure 2:
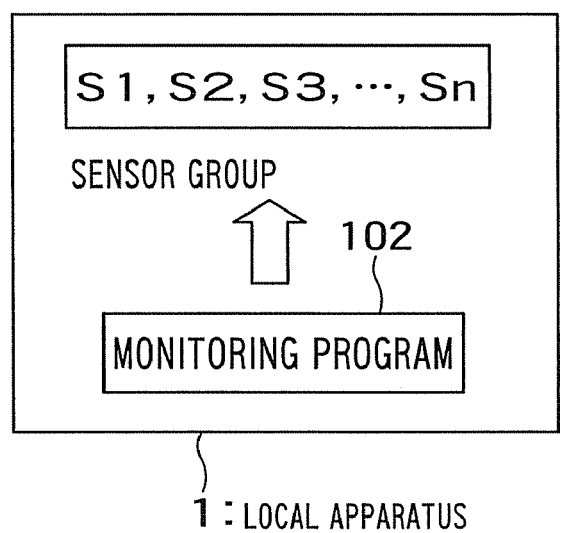
FIG. 2 is a diagram showing a structure of a local apparatus.

FIG. 1 shows a structure of an entire monitoring system. Plural local apparatuses 1 of an identical model are monitoring objects. Specific examples of the local apparatuses 1 are an elevator, a copying machine, and the like. As shown in FIG. 2, each of the local apparatuses 1 has "n" sensors S1 to Sn and a program 102 for monitoring a sensor value operates. An example of a sensor of the elevator is opening and closing speed and the like and an example of a sensor of the copying machine is rotation speed of a drum and the like. The monitoring program holds an upper limit and a lower limit of a proper section (a normal range) of sensor values and judges whether a sensor value is in this section. When a sensor value deviates from the proper section, the monitoring program notifies a center apparatus 100 of a result of abnormality. The center apparatus 100 receives the abnormality notification from the local apparatus 1 and takes a measure after that, for example, dispatch of an inspector. In this embodiment, a method of generating an upper limit and a lower limit (hereinafter referred to as monitoring models) for finding abnormality of a sensor S1 will be described. Considering that values of the sensor fluctuate according to a normal distribution, the upper limit and the lower limit are often determined from an average and a variance of the values. In this embodiment, assuming that a variance (or a standard deviation) of the sensor S1 is fixed, a case in which the average fluctuates for each of apparatuses will be described. The variance or the standard deviation is an example of an indicator representing variation.

Figure 3:
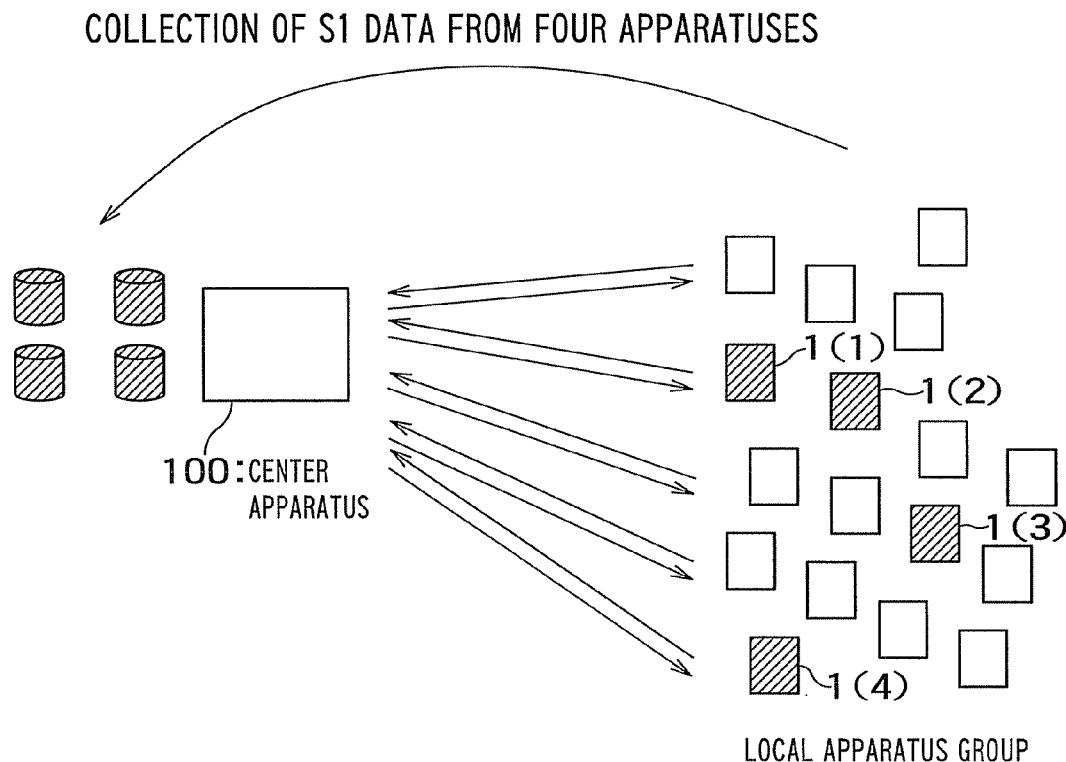
FIG. 3 is a diagram showing a state in which data are collected from sample apparatuses.
Figure 4:
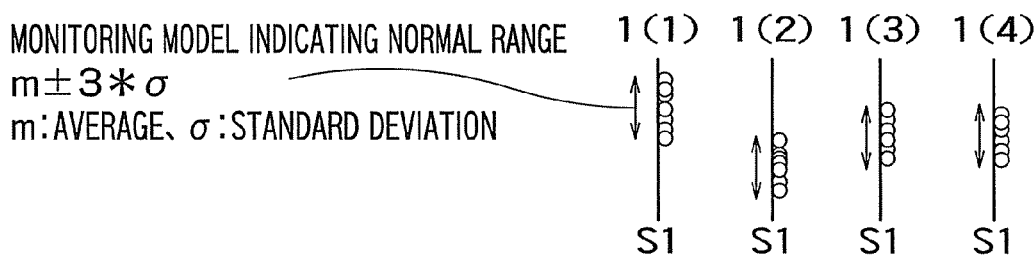
FIG. 4 is a diagram showing a monitoring model for each of the sample apparatuses.

Several sample apparatuses are selected out of the local apparatuses in FIG. 1 at random and history data of S1 are collected. FIG. 3 shows a state in which data are collected in the center apparatus 100 from four apparatuses (hatched apparatuses) 1(1) to 1(4). FIG. 4 is an example in which, from the data of the sample apparatuses 1(1) to 1(4) collected, monitoring models are generated for each of the apparatuses according to a conventional method. Ranges of arrows in the figure are normal ranges of S1 of the respective apparatuses. Individual dots on S1 axes are sensor data and $m-3\sigma$ to $m+3\sigma$ calculated using an average "m" and a variance "$\sigma^2$" of the data is set as a normal range. $\sigma$ is a standard deviation (fluctuation). As it is evident from FIG. 4, the monitoring models (the upper limit and the lower limit) are different for each of the sample apparatuses. Therefore, it is impossible to uniquely determine monitoring models appropriate for all the apparatuses out of these monitoring models.

A procedure for generating monitoring modes for each of the local apparatuses using averages and standard deviations calculated for the respective sample apparatuses will be hereinafter explained.

FIG. 5 is a table in which averages "m" and standard deviations "$s(\sigma)$" of the respective monitoring models in FIG. 4 are collated. In this embodiment, assuming that standard deviations of sensor values in the respective local apparatuses are equal, sm=0.60 obtained by averaging "s" in FIG. 5 is used. When an average "mm" of the averages "m" and a standard deviation "ms" of the averages "m" are calculated, mm=4 and ms=0.667 in a sample in FIG. 5. Here, assuming that an average follows a normal distribution, a confidence interval [a, b] of the averages "m" is calculated. For example, when a 95% confidence interval is assumed, about [mm−2 ms, mm+2 ms], that is, [2.66, 5.33] is a confidence interval. A local monitoring model for each of the local apparatuses (the local apparatuses different from the sample apparatuses and the sample apparatuses) is generated from this confidence interval and the sensor data acquired in the local apparatuses.

Figure 6:
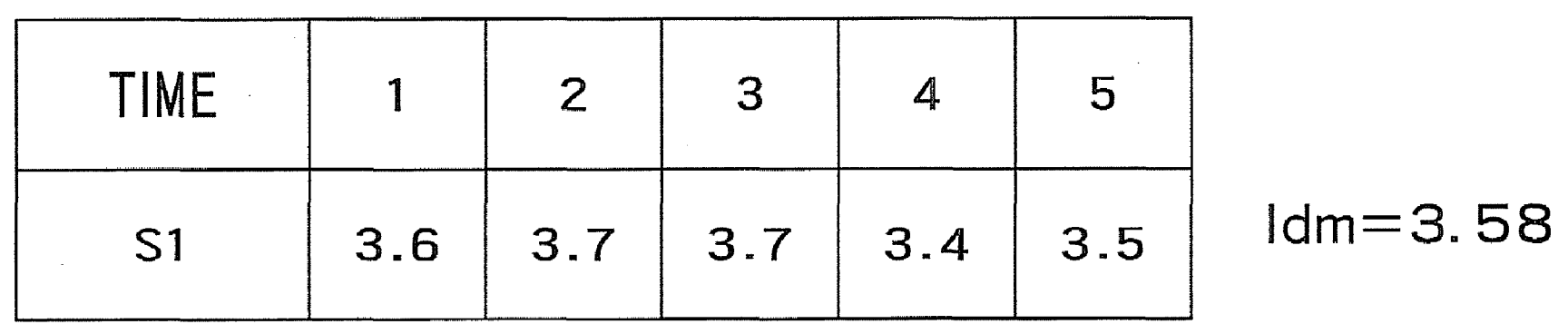

It is assumed that data for 5 times are collected for the sensors S1 of the local apparatuses (FIG. 6). Here, assuming that a population of these sensor values follows a normal distribution $N(lm, ls^2)$ of an average "lm" and a standard deviation "ls", a local monitoring model is generated by determining lm. As described above, ls is fixed, and sm is used. It is assumed that lm takes only a value in the confidence interval calculated above and, when lm deviates from this section, lm is a value closest to the confidence interval. For example, in an example in FIG. 6, since an average "ldm" of data of the sensors S1 of the local apparatuses is 3.58, which is in the confidence interval, lm=ldm=3.58. If ldm is smaller than a lower limit 2.66 of the confidence interval, lm=2.66. When ldm is larger than an upper limit of the confidence interval, lm=5.33.

Figure 7:
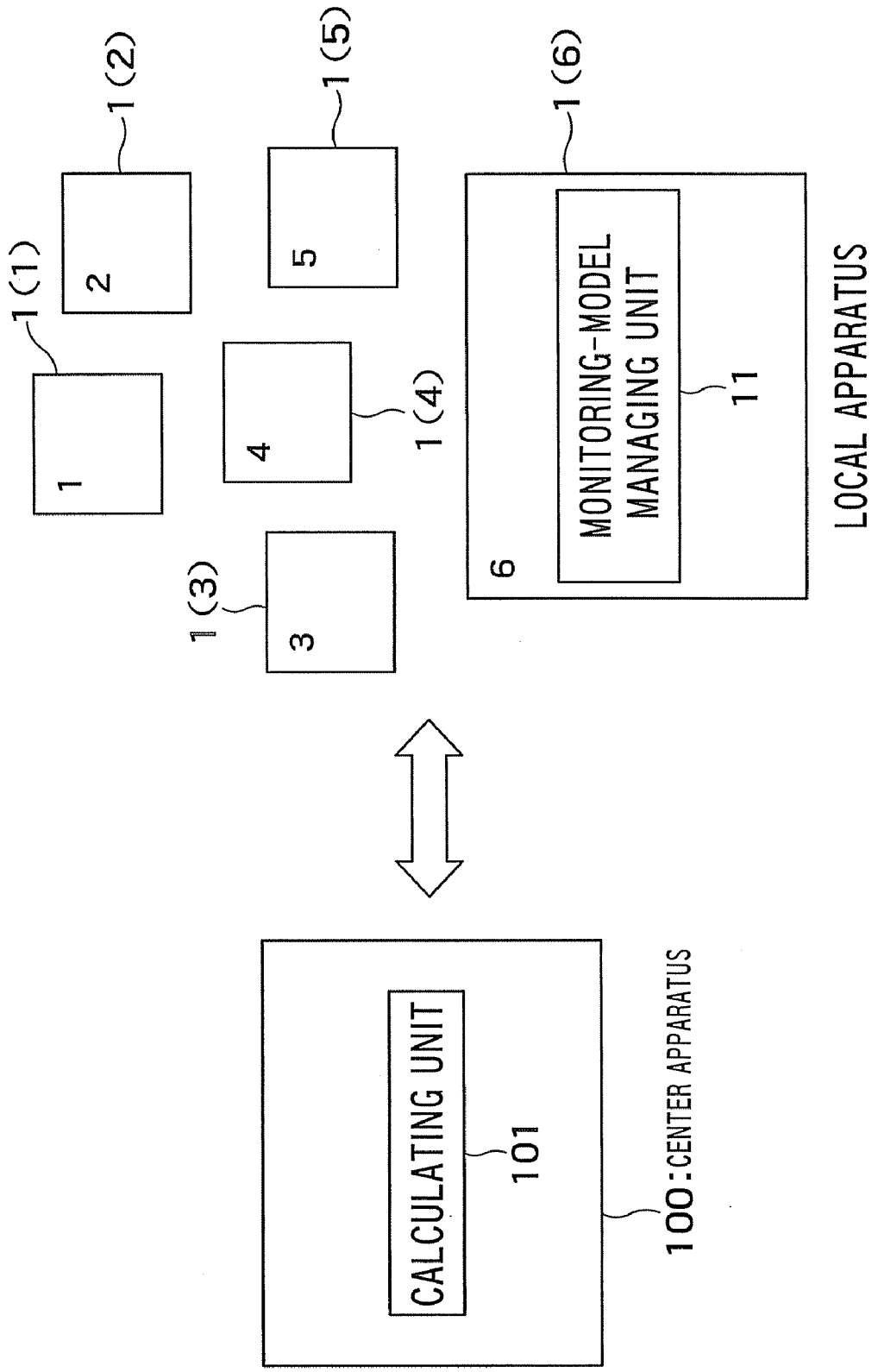
FIG. 7 is a block diagram of the monitoring system.
Figure 8:
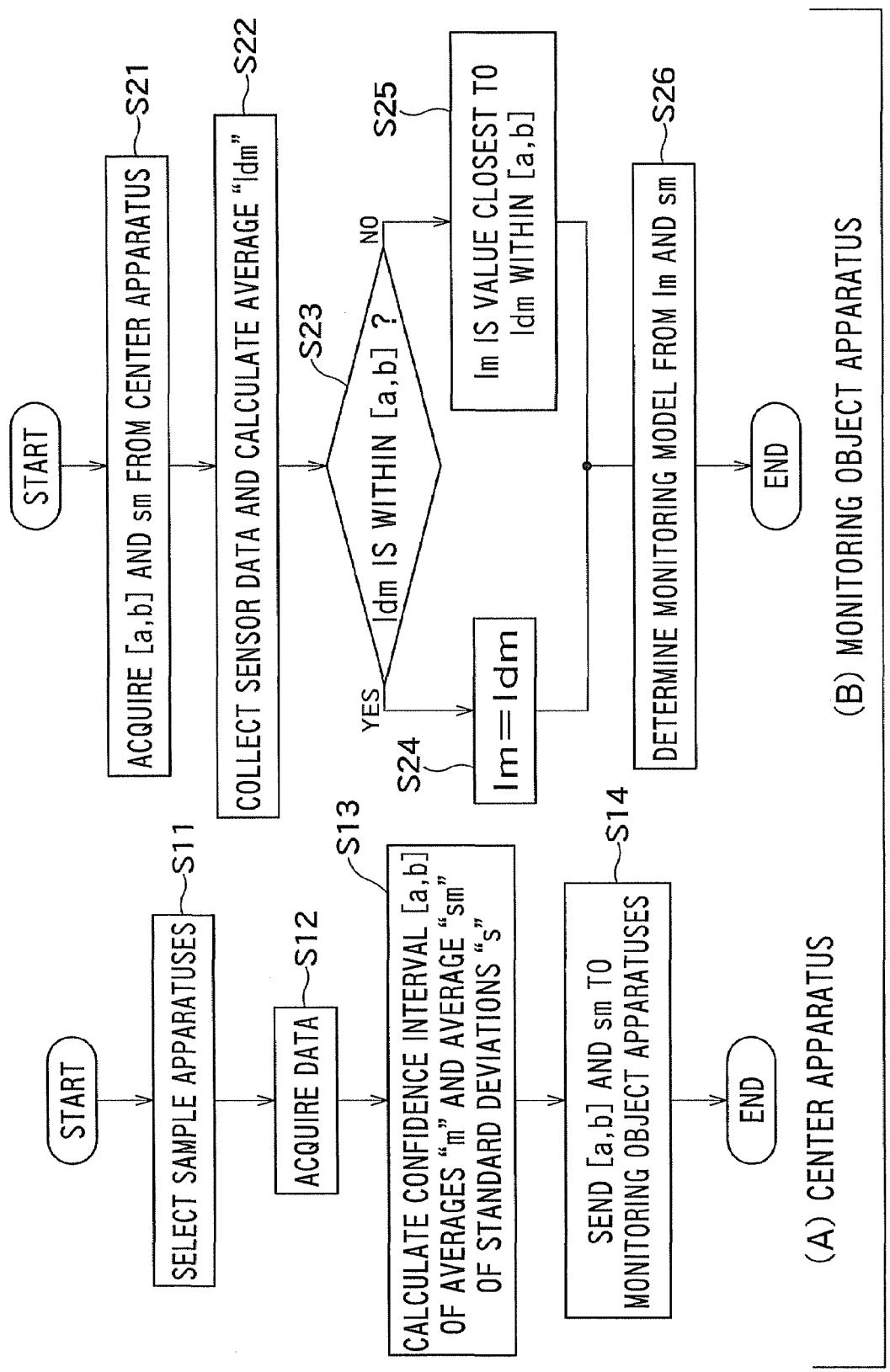
FIG. 8 is a flowchart for explaining processing according to a first embodiment.

A processing flow in this embodiment will be explained using FIGS. 7 and 8. One center apparatus 100 and six local apparatuses 1(1) to 1(6) are shown in FIG. 7. A processing flow shown in FIG. 8(A) is performed in a calculating unit 101 of the center apparatus 100. The calculating unit 101 of the center apparatus 100 selects local apparatuses at random (S11). Step S11 is equivalent to, for example, a selecting step or processing by a selecting unit. The calculating unit 101 acquires sensor time-series data from the sample apparatuses selected at random (S12). The calculating unit 101 calculates a confidence interval [a, b] of averages "m" and an average of standard deviations "s" from data acquired from the respective sample apparatuses (S13). Step S13 is equivalent to, for example, a first calculating step and a second calculating step and equivalent to processing by a first calculating unit and a second calculating unit. The calculating unit 101 sends a calculation result to the monitoring object apparatuses (the local apparatuses) 1(1) to 1(6) (S14). In the monitoring object apparatuses 1(1) to 1(6), a processing flow shown in FIG. 8(B) is performed in a monitoring-model managing unit 11. The monitoring-model managing unit 11 of the local apparatus acquires the confidence interval [a, b] of the averages "m" and the average "sm" of the standard deviations from the center apparatus 100 (S21). Thereafter, the monitoring-model managing unit 11 collects sensor data from sensors in the local apparatuses and calculates an average "ldm" of the sensor data (S22). The monitoring-model managing unit 11 compares this average "ldm" and the confidence interval [a, b] (S23). When the average "ldm" is within the confidence interval [a, b] (YES in S23), the monitoring-model managing unit 11 sets lm in a normal distribution $N(lm, ls^2)$ to the average "ldm" (S24). When the average "ldm" is not within the confidence interval [a, b] (NO in S23), the monitoring-model managing unit 11 sets lm to a value closest to the average "ldm" within the confidence interval (S25). The monitoring-model managing unit 11 determines a monitoring model using lm and ls=sm (S26). For example, the monitoring-model managing unit 11 sets a monitoring model (a normal range) to [lm−2sm, lm+2sm]. Steps S22 to S26 are equivalent to, for example, a normal range calculating step.

In this embodiment, the example in which the center apparatus acquires sensor data from the respective sample apparatuses and calculates averages and standard deviations of the sensor data of the respective sample apparatuses is described. However, it is also possible that the respective sample apparatuses calculate averages and standard deviations of sensor data and transmits the averages and the standard deviations to the center apparatus.

According to this embodiment, monitoring models (normal ranges) in the respective apparatuses are calculated from a confidence interval of averages of sensor values and an average of fluctuation acquired from the sensor data collected from only the respective sample apparatuses and sensor data detected in the respective apparatuses. Thus, it is possible to obtain a normal range for each of the apparatuses with a small calculation load while reflecting an individual difference thereon. It is also possible to prevent a monitoring model of each of the respective apparatuses from extremely deviating from monitoring models of the other apparatuses.

Second Embodiment

In this embodiment, as in the first embodiment, a method of generating monitoring models of local apparatuses from history data of sensors S1 of apparatuses selected at random (sample apparatuses) and data collected in local apparatuses to be monitoring objects in the monitoring system in FIG. 1 will be described.

It is assumed that the history data of the sensor S1 collected from the sample apparatuses are data shown in FIG. 5 and the data collected in the local apparatuses are data shown in FIG. 6. As in the first embodiment, it is assumed that a standard deviation "ls" of a normal distribution $N(lm, ls^2)$ followed by a population of sensor values in the local apparatuses is an average "sm" of standard deviations of sensor S1 data of the respective sample apparatuses. In the second embodiment, monitoring models (normal ranges) are changed according to input of time data (sensor data at each time) to the local apparatuses. A method of Bayes statistics is used for generation of monitoring models. According to a document "Hiroshi Watanabe, A Guide to Bayes Statistics" page 105, when an average "mm" of averages "m" of a prior distribution of a normal distribution, a standard deviation "ms" of the averages, and a standard deviation "sm" of monitoring models are given and a number "n" and an average "ldm" of observation data of monitoring object apparatuses are given, a posterior distribution of averages of monitoring models follows the following normal distribution.

$$N\left(\frac{\frac{n \cdot ldm}{sm^2} + \frac{mm}{ms^2}}{\frac{n}{sm^2} + \frac{1}{ms^2}}, \frac{1}{\frac{n}{sm^2} + \frac{1}{ms^2}}\right) \quad \text{[Formula 1]}$$

Since $mm=4$, $ms^2=0.666^2=0.44$, and $sm^2=0.6^2=0.36$, when sensor data (time data) at first time in FIG. 6 is inputted, $n=1$ and $ldm=3.6$ are substituted and 3.78 is obtained as an average "lm" of the monitoring models (a term on the left side in Formula 1). Time of the input and an average of monitoring models at that point (the term on the left side in Formula 1) are shown in FIG. 9. In this way, as the number of times inputted increases, contents of data collected in the local apparatuses are reflected on the monitoring models. A monitoring model (a normal range) is represented as, for example, [lm−2sm, lm+2sm] (as described above, ls=sm). Instead of using the sensor data at the respective times shown in FIG. 6, a moving average of the sensor data may be used. For example, sensor data acquired at the respective times are sectioned in a unit of 10 times and an average of the respective sections is set as one sensor data. Sensor data obtained by sampling at predetermined time intervals may be used. Alternatively, a combination of the moving average and the sampling may be used.

Figure 10:
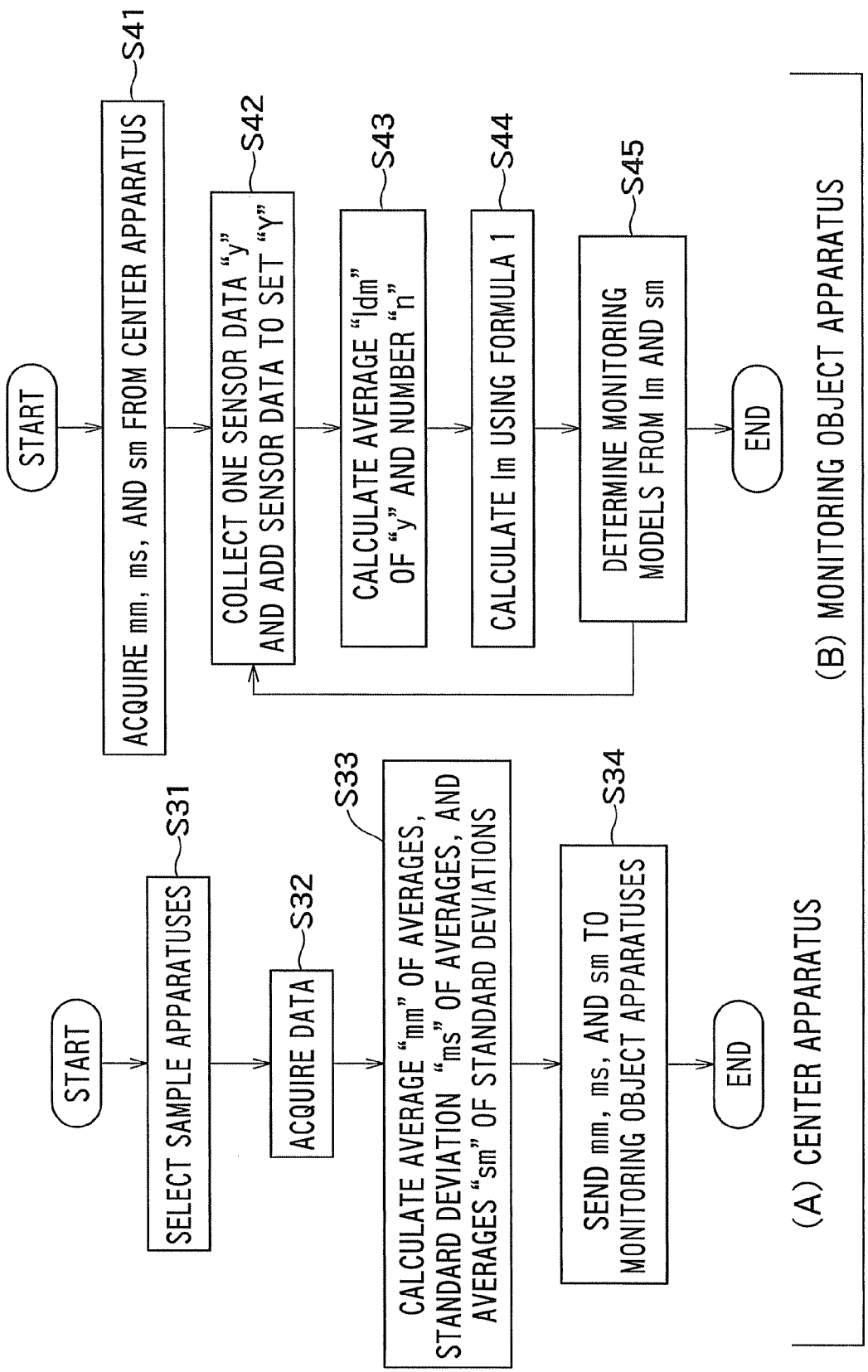
FIG. 10 is a flowchart according to a second embodiment.

A processing flow of this embodiment will be explained using FIGS. 7 and 10. As shown in FIG. 10(A), the calculating unit 101 of the center apparatus 100 selects local apparatuses at random (S31). The calculating unit 101 acquires sensor time-series data from the sample apparatuses selected at random (S32). The calculating unit 101 calculates an average "mm" of averages "m", a standard deviation "ms" of the averages, and an average "sm" of standard deviations from the data acquired from the respective sample apparatuses (S33). Step S33 is equivalent to, for example, a third calculating step or processing by a third calculating unit. The calculating unit 101 sends a calculation result to the monitoring object apparatuses (the local apparatuses) (S34). On the other hand, as shown in FIG. 10(B), the monitoring-model managing unit 11 in the monitoring-object apparatus acquires mm, ms, and sm from the center apparatus 100 (S41). Thereafter, the monitoring-model managing unit 11 collects sensor data of the local apparatuses for one time "y" and adds the sensor data to a set "Y" (S42). The monitoring-model managing unit 11 acquires an average "ldm" of the set "Y" and a number "n" of sensor data in the set "Y" (S43). The monitoring-model managing unit 11 substitutes the average "ldm" and the number "n" in Formula 1 to calculate a distribution of averages and calculates a mean (average) lm of the distribution (S44). The monitoring-model managing unit 11 determines a monitoring model using the mean (average) lm of the distribution (the term on the left side in Formula 1) and sm (S45). Instead of the mean "lm", a value in a predetermined threshold range from the mean "lm" may be used. For example, a term on the right side of Formula 1 represents a variance "σ²". It is possible to calculate a monitoring model using this variance. A confidence interval of the mean "lm" may be set as a threshold range. As an example, a 95% confidence interval is [lm−2σ, lm+2,] and a value in this range may be used. Steps S32 to S45 are equivalent to, for example, a normal-range calculating step or processing by a normal-range calculating unit.

According to this embodiment, as in the first embodiment, it is possible to obtain a normal range for each of the apparatuses with a small calculation load while reflecting an individual difference thereon. It is also possible to prevent a monitoring model of each of the respective apparatuses from extremely deviating from monitoring models of the other apparatuses.

Third Embodiment

It is assumed that, in generating monitoring models, processing is performed in the same manner as the second embodiment, and data of the sensors S1 obtained in the local apparatuses are as shown in FIG. 11. Here, when an average "lm" of monitoring models (the term on the left side in Formula 1) is calculated using sensor data 1.2 at a first time as in the second embodiment, 2.46 is obtained. When a standard deviation "sm" of the monitoring models is set to 0.6 and ±2sm is set as a normal range, since a normal range of sensor data is [1.26, 3.66], the data at the first time in FIG. 11 is not included in the normal range and judged as abnormal. Therefore, this sensor data is not used for generation of monitoring models. Subsequently, when an average "lm" of monitoring models (the term of the left side in Formula 1) is calculated using data 1.3 at a second time, 2.52 is obtained. Similarly, when sm=0.6, a normal range of sensor data is [1.32, 3.72]. Therefore, sensor data at the second time is not included in the normal range and judged as abnormal. Therefore, this sensor data is not used for generation of monitoring models either. When processing is performed in the same manner at third and subsequent times, since sensor data at the respective times are judged as normal, the sensor data at the third and subsequent times shown in FIG. 11 are used for generation of monitoring models. The transition of the average "lm" of monitoring models according to this embodiment is shown in FIG. 12. Sensor data not included in normal ranges are not used for generation of monitoring models in this way to prevent abnormal values from being reflected on monitoring models to be generated. As in the second embodiment, instead of using the sensor data at respective times shown in FIG. 11, a moving average of the sensor data or sensor data acquired by sampling at predetermined time intervals may be used. Alternatively, a combination of the moving average and the sampling may be used.

Figure 13:
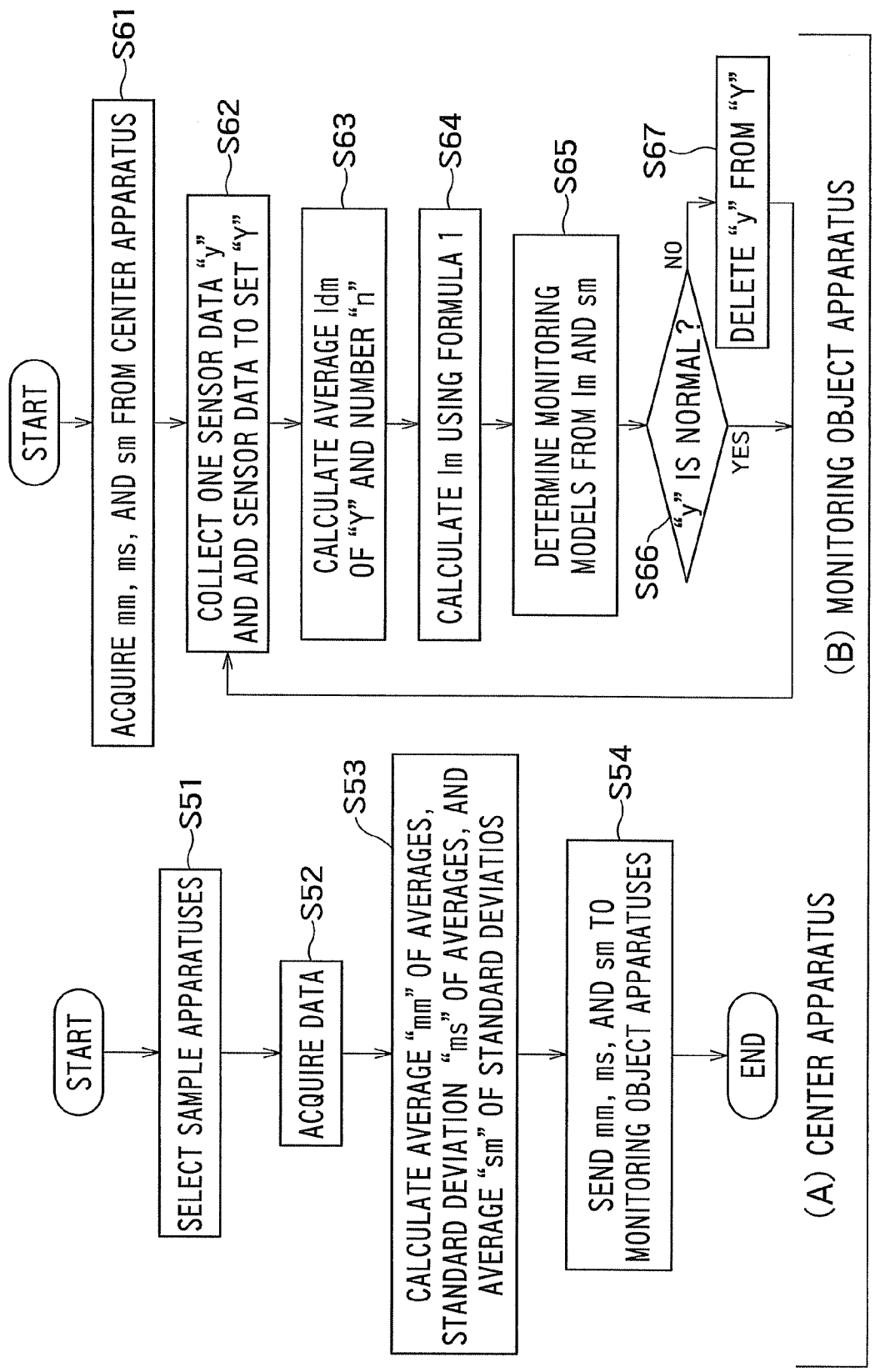
FIG. 13 is a flowchart for explaining processing according to a third embodiment.

A processing flow of this embodiment will be explained using FIGS. 7 and 13. As shown in FIG. 13(A), the calculating unit 101 of the center apparatus 100 selects local apparatuses at random (S51). The calculating unit 101 acquires sensor time-series data from the respective sample apparatuses selected at random (S52). The calculating unit 101 calculates an average "mm" of averages "m", a standard deviation "ms" of the averages, and an average "sm" of standard deviations from the data acquired from the respective sample apparatuses (S53). The calculating unit 101 sends a calculation result to the monitoring object apparatuses (S54). On the other hand, as shown in FIG. 13(B), the monitoring-model managing unit 11 in the monitoring object apparatus acquires mm, ms, and sm from the center apparatus 100 (S61). Thereafter, the monitoring-model managing unit 11 collects sensor data of the local apparatuses for one time "y" and adds the sensor data to a set "Y" (S62). The monitoring-model managing unit 11 substitutes an average "ldm" of the set "Y" and a number "n" of sensor data included in the set "Y" in Formula 1 to calculate a distribution of averages (S64). The monitoring-model managing unit 11 determines a monitoring model (a normal range) using a mean (average) lm of the distribution and sm (S65). The monitoring-model managing unit 11 judges abnormality of sensor data "y" using this monitoring model (S66). When the sensor data "y" is normal (YES in S66), the monitoring-model managing unit 11 returns to step S62. When the sensor data "y" is abnormal (NO in S66), the monitoring-model managing unit 11 deletes the sensor data "y" from the set "Y" (S67). After that, this sensor data is not used for generation of monitoring models. In this embodiment, it is judged whether only latest sensor data is within a normal range. However, it is also possible that it is judged whether all sensor data included in the set "Y" are included in normal ranges and all sensor data not included in the normal ranges are deleted.

Fourth Embodiment

In the first embodiment or the second and the third embodiment, when sensor S1 data in a number designated by the user are collected in the local apparatuses or when a predetermined period designated by the user has elapsed, an average and a standard deviation of the sensor S1 data are calculated and sent from the local apparatuses (including both the sample apparatuses and the local apparatus that are not the sample apparatuses) to the center apparatus. The center apparatus recalculates the confidence interval [a, b] and the average "sm" of standard deviations in the first embodiment or the average "mm" of averages, the standard deviation "ms" of the averages, and the average "sm" of standard deviations in the second and the third embodiments. The respective embodiments are carried out using these values recalculated. Consequently, it is possible to generate monitoring models reflecting behaviors of a large number of monitoring object apparatuses (local apparatuses).

Figure 14:
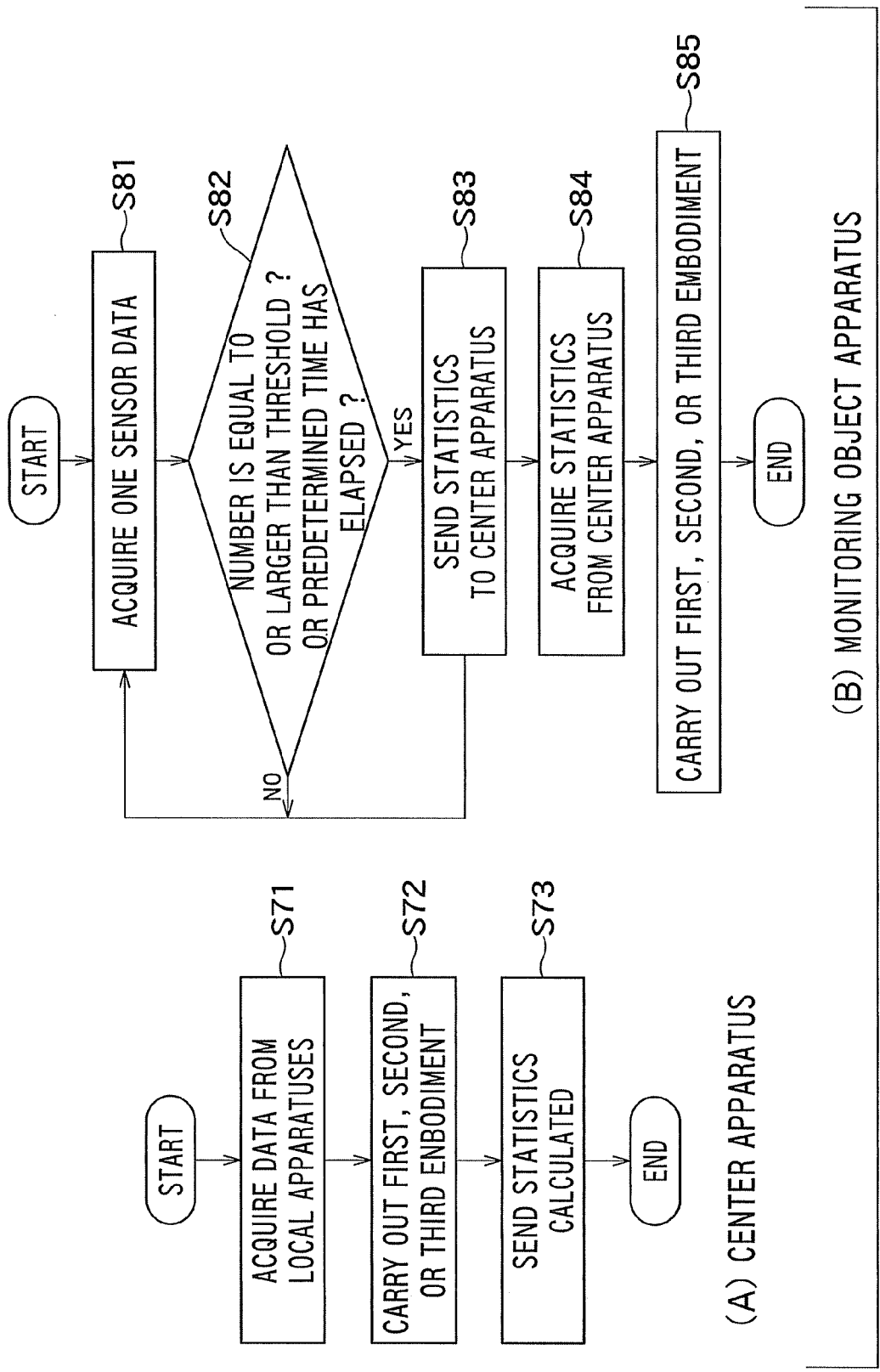
FIG. 14 is a flowchart for explaining processing according to a fourth embodiment.

A processing flow of this embodiment will be explained using FIGS. 7 and 14. As shown in FIG. 14(A), the calculating unit 101 of the center apparatus 100 acquires averages and standard deviations from the local apparatuses (S71). The calculating unit 101 recalculates the statistics (the average "mm" of the averages, the standard deviation "ms" of the averages, the confidence interval [a, b], and the average "ms" of the standard deviations) calculated in the first, the second, and the third embodiments using the averages and the standard deviations acquired (S72). The calculating unit 101 sends a calculation result to the respective local apparatuses (monitoring object apparatuses) (S73). On the other hand, as shown in FIG. 14(B), the local apparatus collects sensor data from the sensors (S81). The local apparatus judges whether the number of sensor data collected is equal to or larger than a threshold or whether a predetermined period has elapsed (S82). When one of these holds (YES in S82), the local apparatus calculates an average and a standard deviation and sends the average and the standard deviation to the center apparatus 100 (S83). Thereafter, the local apparatus reacquires the statistics (the average "mm" of the averages, the standard deviation "ms" of the averages, the confidence interval [a, b], and the average "ms" of the standard deviations) calculated by the center apparatus 100 (S84). The local apparatus generates monitoring models as explained in the second and the third embodiments (S85).

In this embodiment, averages and standard deviations of the sensor S1 data are calculated in the respective local apparatuses and sent to the center apparatus. However, it is also possible that the sensor S1 data are transmitted from the respective local apparatuses to the center apparatus and the center apparatus calculates averages and standard deviations of the respective local apparatuses.

Fifth Embodiment

Figures 15, 16:
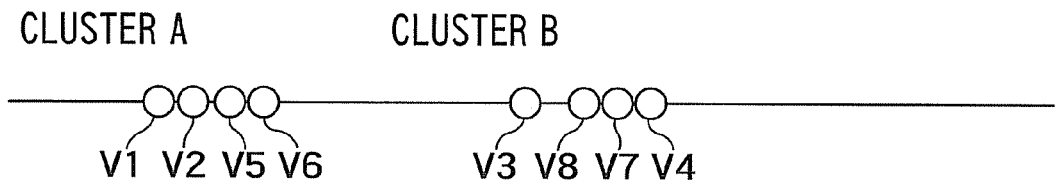
FIG. 15 is a diagram showing an average of local S1 data collected and clustering thereof.
FIG. 16 is a diagram showing peculiar information of a local apparatus.
Figure 17:
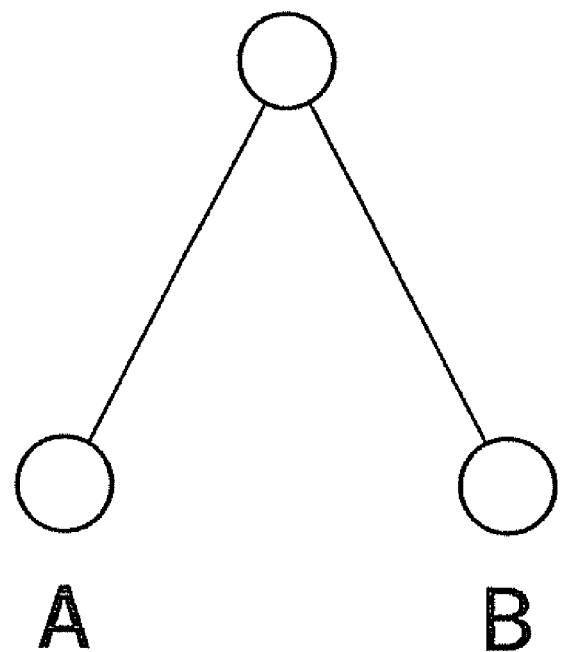
FIG. 17 is a diagram showing an example of a decision tree for classifying classes A and B.

In the first to the fourth embodiments, when averages are calculated from sensor S1 data of the respective local apparatuses or when averages of sensor S1 data are collected from the respective local apparatuses, the center apparatus performs clustering of the averages obtained from the respective local apparatuses. For example, as shown in FIG. 15, when averages V1 to V8 are obtained from eight local apparatuses ID1 to ID8, clusters A and B are generated by clustering. As the clustering, for example, an agglomerative method or a k-means method can be used. The local apparatuses ID1, ID2, ID5, and ID6 having averages V1, V2, V5, and V6 are classified into the cluster A and the apparatuses ID3, ID4, ID7, and ID8 having averages V3, V4, V7, and V8 are classified into the cluster B. Here, it is checked whether there is a characteristic that distinguishes the apparatuses classified into the cluster A and the apparatuses classified into the cluster B. A table shown in FIG. 16 is, for example, individual information of the respective apparatuses ID1 to ID8 in the case of elevators. In this table, using a cluster attribute as a class and an installation year, a type, and a location as attributes, a decision tree (a classification rule or inference rule) for predicting a class from one or more attributes is generated. The decision tree generated is shown in FIG. 17. Individuals are classified into classes A and B according to installation years. Classification of all the local apparatuses is performed using this decision tree to classify the local apparatuses into the classes A and B. After that, a different monitoring model is generated for each of the classes A and B.

Figure 18:
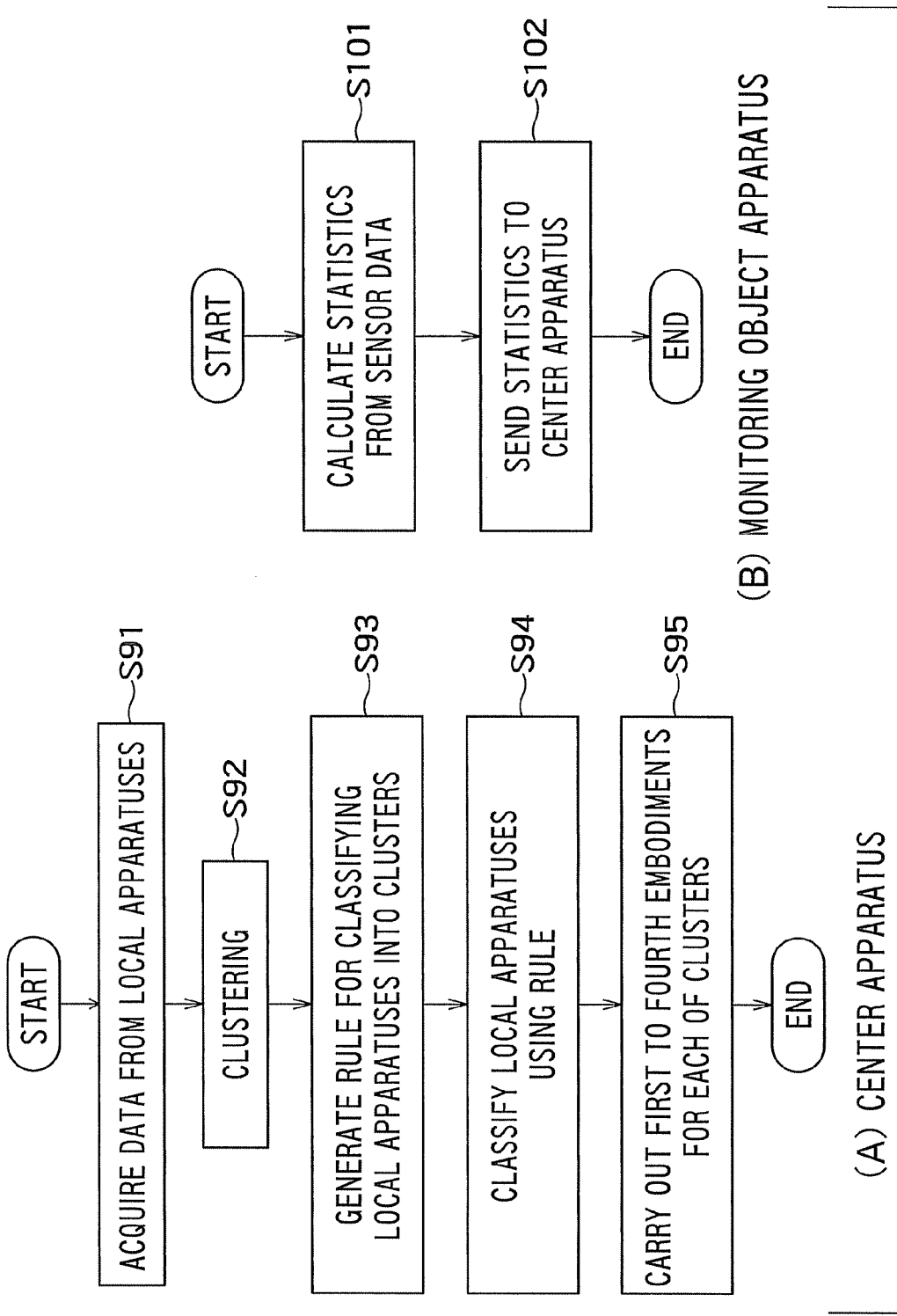
FIG. 18 is a flowchart for explaining processing according to a fifth embodiment.

A processing flow of this embodiment will be explained using FIGS. 7 and 18. As shown in FIG. 18(A), the calculating unit 101 of the center apparatus 100 collects statistics (e.g., averages and standard deviations (or variances)) sent from the monitoring object apparatuses (local apparatuses) (S91) and performs clustering (S92). Step S92 is equivalent to, for example, a clustering step or processing by a clustering unit. As the clustering, one-dimensional clustering that uses only one statistic (e.g., average or standard deviations) may be performed or two-dimensional clustering that uses two statistics (e.g., averages and standard deviations) may be performed. Alternatively, three-dimensional or higher-dimensional clustering that uses three or more statistics may be performed. After performing the clustering, the calculating unit 101 generates a classification rule (inference rule) for classifying the respective monitoring object apparatuses into any one of the clusters (S93). Step S93 is equivalent to, for example, a rule generating step or processing by a rule generating unit. The calculating unit 101 classifies the respective local apparatuses using this classifying rule (S94). Step S94 is equivalent to, for example, an inferring step or processing by an inferring unit. After that, the calculating unit 101 performs the processing in the first to the fourth embodiments independently for each of the clusters. For example, in the case of the first embodiment, the calculating unit 101 generates a confidence interval [a, b] of averages "m" and an average "sm" of standard deviations "s" sent to the respective local apparatuses belonging to a certain cluster from sensor data collected from the respective sample apparatuses belonging to the identical cluster. On the other hand, as shown in FIG. 18(B), the monitoring-model managing unit 11 of the monitoring object apparatus collects sensor data and calculates statistics (S101). Step S101 is equivalent to, for example, a statistic calculating step or processing by a statistic calculating unit. The monitoring-model managing unit 11 sends the statistics calculated to the center apparatus 100 (S102). The calculation of statistics may be performed in the center apparatus 100. After that, the local apparatus is classified into any one of the clusters by the center apparatus 100.

What is claimed is:

1. A monitoring method of monitoring plural apparatuses each having a sensor, comprising:

selecting two or more sample apparatuses out of the plural apparatuses;

calculating averages and standard deviations of sensor values detected by the sample apparatuses for each sample apparatus;

calculating a confidence interval of the averages and an average of the standard deviations; and calculating an average of sensor values detected by an arbitrary apparatus among the plural apparatuses as an object average and calculating a normal range of the sensor of the arbitrary apparatus from the object average, the confidence interval, and the average of the standard deviations, wherein when the object average is included in the confidence interval, a normal range of the sensor is calculated from the object average and the average of the standard deviations and when the object average is not included in the confidence interval, a normal range of the sensor is calculated from a value within the confidence interval closest to the object average and the average of the standard deviations.

2. The method according to claim 1 wherein as the normal range, a range of ±(a predetermined coefficient×the average of the standard deviations) with respect to the object average or the value within the confidence interval closest to the average calculated.

3. A monitoring method of monitoring plural apparatuses each having a sensor, comprising:

selecting two or more sample apparatuses out of the plural apparatuses;

calculating averages and standard deviations of sensor values detected by the sample apparatuses for each sample apparatus;

calculating a confidence interval of the averages and an average of the standard deviations;

calculating an average of sensor values detected by an arbitrary apparatus among the plural apparatuses as an object average and calculating a normal range of the sensor of the arbitrary apparatus from the object average, the confidence interval, and the average of the standard deviations;

calculating, when sensor values in a number designated in advance are collected in the arbitrary apparatus or when a predetermined period designated in advance has elapsed, an average and a standard deviation of the sensor values detected by the arbitrary apparatus, and updating, by using the average and the standard deviation calculated for the arbitrary apparatus, the confidence interval and the average of the standard deviations.

4. A monitoring method of monitoring plural apparatuses each having a sensor, comprising:

selecting two or more sample apparatuses out of the plural apparatuses;

calculating averages and standard deviations of sensor values detected by the sample apparatuses for each sample apparatus;

calculating a confidence interval of the averages and an average of the standard deviations;

calculating an average of sensor values detected by an arbitrary apparatus among the plural apparatuses as an object average and calculating a normal range of the sensor of the arbitrary apparatus from the object average, the confidence interval, and the average of the standard deviations;

calculating desired statistics from the sensor values of each sample apparatus for each of the sample apparatuses;

clustering the sample apparatuses and divide the sample apparatuses into plural groups according to the statistics calculated for the sample apparatuses;

generating, based on plural attribute values of each of the sample apparatuses and the groups to which the sample apparatuses belong, an inference rule for inferring a group from one or more attribute values; and inferring, from the inference rule, a group to which the arbitrary apparatus belongs, wherein for each of the groups, the confidence interval and the average of the standard deviations are calculated, and the normal range of the sensor of the arbitrary apparatus is calculated from the sensor values detected from the arbitrary apparatus and the confidence interval and the average of the standard deviations obtained from the group to which the arbitrary apparatus belongs.

5. A monitoring method that monitors plural apparatuses each having a sensor, comprising:

selecting two or more sample apparatuses out of the plural apparatuses;

calculating, by sensor values detected from the sample apparatuses, a sample average obtained by averaging averages of sensor values of each sample apparatus, a sample standard deviation that is a standard deviation of the averages of the sensor values of each sample apparatus, and a standard deviation average obtained by averaging standard deviations of the sensor values of each sample apparatus; and calculating a mean of a normal distribution of averages of sensor values of an arbitrary apparatus among the plural apparatuses or a value within a threshold range with respect to the mean by using a number and an average of the sensor values detected from the arbitrary apparatus, the sample average, the sample standard deviation, and the standard deviation average, and calculating a normal range of the sensor of the arbitrary apparatus from the mean or the value within the threshold range and the standard deviation average, wherein a range of ±(a predetermined coefficient×the standard deviation average) with respect to the mean or the value within the threshold range is calculated as the normal range.

6. A monitoring method that monitors plural apparatuses each having a sensor, comprising:

selecting two or more sample apparatuses out of the plural apparatuses;

calculating, by sensor values detected from the sample apparatuses, a sample average obtained by averaging averages of sensor values of each sample apparatus, a sample standard deviation that is a standard deviation of the averages of the sensor values of each sample apparatus, and a standard deviation average obtained by averaging standard deviations of the sensor values of each sample apparatus; and calculating a mean of a normal distribution of averages of sensor values of an arbitrary apparatus among the plural apparatuses or a value within a threshold range with respect to the mean by using a number and an average of the sensor values detected from the arbitrary apparatus, the sample average, the sample standard deviation, and the standard deviation average, and calculating a normal range of the sensor of the arbitrary apparatus from the mean or the value within the threshold range and the standard deviation average, wherein the normal range is calculated every time a predetermined number of sensor values are detected from the arbitrary apparatus, sensor values not included in the normal range are detected from the sensor values used for calculation of the normal range, and the sensor values detected are not used for calculation of a normal range in next and subsequent times.

7. A monitoring method that monitors plural apparatuses each having a sensor, comprising:

selecting two or more sample apparatuses out of the plural apparatuses;

calculating, by sensor values detected from the sample apparatuses, a sample average obtained by averaging averages of sensor values of each sample apparatus, a sample standard deviation that is a standard deviation of the averages of the sensor values of each sample apparatus, and a standard deviation average obtained by averaging standard deviations of the sensor values of each sample apparatus; and calculating a mean of a normal distribution of averages of sensor values of an arbitrary apparatus among the plural apparatuses or a value within a threshold range with respect to the mean by using a number and an average of the sensor values detected from the arbitrary apparatus, the sample average, the sample standard deviation, and the standard deviation average, and calculating a normal range of the sensor of the arbitrary apparatus from the mean or the value within the threshold range and the standard deviation average, wherein averages of the sensor values in each sample apparatus and standard deviations of the sensor values in each sample apparatus are calculated; and the sample average, the sample standard deviation, and the standard deviation average are calculated from the averages and the standard deviations calculated for each sample apparatus; the method further comprising:

calculating, when sensor values in a number designated in advance are collected in the arbitrary apparatus or when a predetermined period designated in advance has elapsed, an averages and a standard deviation of the sensor values detected by the arbitrary apparatus, and updating the sample average, the sample standard deviation, and the standard deviation average using the average and the standard deviation calculated for the arbitrary apparatus.

8. A monitoring method that monitors plural apparatuses each having a sensor, comprising:

selecting two or more sample apparatuses out of the plural apparatuses;

calculating, by sensor values detected from the sample apparatuses, a sample average obtained by averaging averages of sensor values of each sample apparatus, a sample standard deviation that is a standard deviation of the averages of the sensor values of each sample apparatus; and a standard deviation average obtained by averaging standard deviations of the sensor values of each sample apparatus; and calculating a mean of a normal distribution of averages of sensor values of an arbitrary apparatus among the plural apparatuses or a value within a threshold range with respect to the mean by using a number and an average of the sensor values detected from the arbitrary apparatus, the sample average, the sample standard deviation, and the standard deviation average, and calculating a normal range of the sensor of the arbitrary apparatus from the mean or the value within the threshold range and the standard deviation average;

calculating desired statistics from the sensor values of each sample apparatus for each of the sample apparatuses;

clustering the sample apparatuses and divide the sample apparatuses into plural groups according to the statistics calculated for the sample apparatuses;

generating, based on plural attribute values of each of the sample apparatuses and the groups to which the sample apparatuses belong, an inference rule for inferring a group from one or more attribute values; and inferring, from the inference rule, a group to which the arbitrary apparatus belongs, wherein for each of the groups, the sample average, the sample standard deviation, and the standard deviation average are calculated, and the mean or the value within the threshold range with respect to the mean is calculated from the number and the average of the sensor values detected from the arbitrary apparatus, the sample average, the sample standard deviation and the standard deviation average obtained from the group to which the arbitrary apparatus belongs.

9. A monitoring system that monitors plural apparatuses each having a sensor, comprising:

a selecting unit configured to select two or more sample apparatuses out of the plural apparatuses;

a first calculating unit configured to calculate averages and standard deviations of sensor values detected by the sample apparatuses for each sample apparatus;

a second calculating unit configured to calculate a confidence interval of the averages and an average of the standard deviations; and a normal-range calculating unit configured to calculate an average of sensor values detected by an arbitrary apparatus among the plural apparatuses as an object average and calculate a normal range of the sensor of the arbitrary apparatus from the object average, the confidence interval, and the average of the standard deviations, wherein the normal-range calculating unit calculates, when the object average is included in the confidence interval, a normal range of the sensor from the object average and the average of the standard deviations and calculates, when the object average is not included in the confidence interval, a normal range of the sensor from a value within the confidence interval closest to the object average and the average of the standard deviations.

10. The system according to claim 9, wherein the normal-range calculating unit calculates, as the normal range, a range of ±(a predetermined coefficient×the average of the standard deviations) with respect to the object average or the value within the confidence interval closest to the object average.

11. A monitoring system that monitors plural apparatuses each having a sensor, comprising:

a selecting unit configured to select two or more sample apparatuses out of the plural apparatuses;

a first calculating unit configured to calculate averages and standard deviations of sensor values detected by the sample apparatuses for each sample apparatus;

a second calculating unit configured to calculate a confidence interval of the averages and an average of the standard deviations; and a normal-range calculating unit configured to calculate an average of sensor values detected by an arbitrary apparatus among the plural apparatuses as an object average and calculate a normal range of the sensor of the arbitrary apparatus from the object average, the confidence interval, and the average of the standard deviations, wherein the first calculating unit calculates, when sensor values in a number designated in advance are collected in the arbitrary apparatus or when a predetermined period designated in advance has elapsed, an average and a standard deviation of the sensor values detected by the arbitrary apparatus, and the second calculating unit updates, using the average and the standard deviation calculated for the arbitrary apparatus, the confidence interval and the average of the standard deviations.

12. A monitoring system that monitors plural apparatuses each having a sensor, comprising:

a selecting unit configured to select two or more sample apparatuses out of the plural apparatuses;

a first calculating unit configured to calculate averages and standard deviations of sensor values detected by the sample apparatuses for each sample apparatus;

a second calculating unit configured to calculate a confidence interval of the averages and an average of the standard deviations;

a normal-range calculating unit configured to calculate an average of sensor values detected by an arbitrary apparatus among the plural apparatuses as an object average and calculate a normal range of the sensor of the arbitrary apparatus from the object average, the confidence interval, and the average of the standard deviations;

a statistics calculating unit configured to calculate desired statistics from the sensor values of each sample apparatus for each of the sample apparatuses;

a clustering unit configured to cluster the sample apparatuses and divide the sample apparatuses into plural groups according to the statistics calculated for the sample apparatuses;

a rule generating unit configured to generate, based on plural attribute values of each of the sample apparatuses and the groups to which the sample apparatuses belong, an inference rule for inferring a group from one or more attribute values; and an inferring unit configured to infer, from the inference rule, a group to which the arbitrary apparatus belongs, wherein the second calculating unit calculates, for each of the groups, the confidence interval and the average of the standard deviations, and the normal-range calculating unit calculates the normal range of the sensor of the arbitrary apparatus from the sensor values detected from the arbitrary apparatus and the confidence interval and the average of the standard deviations obtained from the group to which the arbitrary apparatus belongs.

13. A monitoring system that monitors plural apparatuses each having a sensor, comprising:
a selecting unit configured to select two or more sample apparatuses out of the plural apparatuses;
a third calculating unit configured to calculate, using sensor values detected from the sample apparatuses,
a sample average obtained by averaging averages of sensor values of each sample apparatus,
a sample standard deviation that is a standard deviation of the averages of the sensor values of each sample apparatus, and
a standard deviation average obtained by averaging standard deviations of the sensor values of each sample apparatus; and
a normal-range calculating unit configured to calculate a mean of a normal distribution of averages of sensor values of an arbitrary apparatus among the plural apparatuses or a value within a threshold range with respect to the mean by using a number and an average of the sensor values detected from the arbitrary apparatus and the sample average, the sample standard deviation, and the standard deviation average calculated in the third calculating unit, and calculate a normal range of the sensor of the arbitrary apparatus from the mean or the value within the threshold range and the standard deviation average,
wherein the third calculating unit includes:
a first unit configured to calculate averages of the sensor values in each sample apparatus and standard deviations of the sensor values in each sample apparatus; and
a second unit configured to calculate the sample average, the sample standard deviation, and the standard deviation average from the averages and the standard deviations calculated for each sample apparatus.

14. A monitoring system that monitors plural apparatuses each having a sensor, comprising:
a selecting unit configured to select two or more sample apparatuses out of the plural apparatuses;
a third calculating unit configured to calculate, using sensor values detected from the sample apparatuses,
a sample average obtained by averaging averages of sensor values of each sample apparatus,
a sample standard deviation that is a standard deviation of the averages of the sensor values of each sample apparatus, and
a standard deviation average obtained by averaging standard deviations of the sensor values of each sample apparatus; and
a normal-range calculating unit configured to calculate a mean of a normal distribution of averages of sensor values of an arbitrary apparatus among the plural apparatuses or a value within a threshold range with respect to the mean by using a number and an average of the sensor values detected from the arbitrary apparatus and the sample average, the sample standard deviation, and the standard deviation average calculated in the third calculating unit, and calculate a normal range of the sensor of the arbitrary apparatus from the mean or the value within the threshold range and the standard deviation average,
wherein the normal-range calculating unit calculates, as the normal range, a range of ±(a predetermined coefficient×the standard deviation average) with respect to the mean or the value within the threshold range.

15. A monitoring system that monitors plural apparatuses each having a sensor, comprising:
a selecting unit configured to select two or more sample apparatuses out of the plural apparatuses;
a third calculating unit configured to calculate, using sensor values detected from the sample apparatuses,
a sample average obtained by averaging averages of sensor values of each sample apparatus,
a sample standard deviation that is a standard deviation of the averages of the sensor values of each sample apparatus, and
a standard deviation average obtained by averaging standard deviations of the sensor values of each sample apparatus; and
a normal-range calculating unit configured to calculate a mean of a normal distribution of averages of sensor values of an arbitrary apparatus among the plural apparatuses or a value within a threshold range with respect to the mean by using a number and an average of the sensor values detected from the arbitrary apparatus and the sample average, the sample standard deviation, and the standard deviation average calculated in the third calculating unit, and calculate a normal range of the sensor of the arbitrary apparatus from the mean or the value within the threshold range and the standard deviation average,
wherein the normal-range calculating unit
calculates the normal range every time a predetermined number of sensor values are detected from the arbitrary apparatus,
detects sensor values not included in the normal range from among the sensor values used for calculation of the normal range, and
does not use the sensor values detected for calculation of a normal range in next and subsequent times.

16. The system according to claim 13, wherein
the first unit in the third calculating unit calculates, when sensor values in a number designated in advance are collected in the arbitrary apparatus or when a predetermined period designated in advance has elapsed, an averages and a standard deviation of the sensor values detected by the arbitrary apparatus, and
the second unit in the third calculating unit updates the sample average, the sample standard deviation, and the standard deviation average using the average and the standard deviation calculated for the arbitrary apparatus.

17. A monitoring system that monitors plural apparatuses each having a sensor, comprising:
a selecting unit configured to select two or more sample apparatuses out of the plural apparatuses;
a third calculating unit configured to calculate, using sensor values detected from the sample apparatuses,
a sample average obtained by averaging averages of sensor values of each sample apparatus,
a sample standard deviation that is a standard deviation of the averages of the sensor values of each sample apparatus, and
a standard deviation average obtained by averaging standard deviations of the sensor values of each sample apparatus;
a normal-range calculating unit configured to calculate a mean of a normal distribution of averages of sensor values of an arbitrary apparatus among the plural apparatuses or a value within a threshold range with respect to the mean by using a number and an average of the sensor values detected from the arbitrary apparatus and the sample average, the sample standard deviation, and the standard deviation average calculated in the third calculating unit, and calculate a normal range of the sensor of the arbitrary apparatus from the mean or the value within the threshold range and the standard deviation average;

a statistics calculating unit configured to calculate desired statistics from the sensor values of each sample apparatus for each of the sample apparatuses;

a clustering unit configured to cluster the sample apparatuses and divide the sample apparatuses into plural groups according to the statistics calculated for the sample apparatuses;

a rule generating unit configured to generate, based on plural attribute values of each of the sample apparatuses and the groups to which the sample apparatus belong, an inference rule for inferring a group from one or more attribute values; and an inferring unit configured to infer, from the inference rule, a group to which the arbitrary apparatus belongs, wherein the third calculating unit calculates, for each of the groups, the sample average, the sample standard deviation, and the standard deviation average, and the normal-range calculating unit calculates the mean or the value within the threshold range with respect to the mean from the number and the average of the sensor values detected from the arbitrary apparatus, the sample average, the sample standard deviation and the standard deviation average obtained from the group to which the arbitrary apparatus belongs.

* * * * *